United States Patent

[11] 3,625,126

[72] Inventor Edwin H. Land
 Cambridge, Mass.
[21] Appl. No. 846,394
[22] Filed July 31, 1969
[45] Patented Dec. 7, 1971
[73] Assignee Polaroid Corporation
 Cambridge, Mass.

[54] PHOTOGRAPHIC PROCESSING APPARATUS INCLUDING AUTOMATIC TIMER
 17 Claims, 4 Drawing Figs.

[52] U.S. Cl. .................................................. 95/13,
 58/42, 251/55
[51] Int. Cl. ...................................................... G03b 17/52
[50] Field of Search .............................. 95/13, 89 L;
 116/65; 58/42, 152; 251/55

[56] References Cited
UNITED STATES PATENTS

| 2,440,314 | 4/1948 | Turner ......................... | 95/89 |
| 2,930,300 | 3/1960 | Danders et al ................ | 95/13 |

Primary Examiner—Samuel S. Matthews
Assistant Examiner—Richard L. Moses
Attorneys—Brown and Mikulka, William D. Roberson and James L. Neal ABSTRACT: An indicator interposed between a hand strap and a self-developing camera is responsive to the exertion and subsequent release of forces producing withdrawal of photographic materials to automatically provide a signal when time required for development of the photographic materials has elapsed.

PATENTED DEC 7 1971 3,625,126

INVENTOR.
EDWIN H. LAND

BY Brown and Mikulka
and
James L. Neal
ATTORNEYS

PHOTOGRAPHIC PROCESSING APPARATUS INCLUDING AUTOMATIC TIMER

BACKGROUND OF THE INVENTION

Self-developing cameras which facilitate development of a photographically exposed photosensitive sheet by the diffusion transfer process have enjoyed extensive popularity for many years. Typically, subsequent to exposure in such cameras, the photosensitive sheet is advanced into superposition with an image-receiving sheet and the two sheets are then drawn between a pair of spreaders to effect the spreading of a processing fluid between them. The sheets remain in superposition with the processing fluid therebetween for a predetermined period of time required for formation of an image upon the image-receiving sheet according to the diffusion transfer process, in a manner which is well known in the art. After lapse of the predetermined time, the image-receiving sheet and the exposed photosensitive sheet are separated to terminate the process. Accordingly, it has been the general practice for the photographer to observe a time piece during the processing of the photographic materials so that the print-supporting sheet may be removed from the exposed photosensitive sheet at precisely the correct time.

Often, a strap, or handle, is provided to assist in portage of the camera when exposures are not being produced and to facilitate withdrawal of the photographic material between the spreaders subsequent to exposure production. The strap is attached to the camera body to oppose exertion of the force for drawing the photographic materials between the spreaders. When the photographic materials are being drawn between the spreaders, the strap is held with one hand and the aforesaid force is exerted with the other.

SUMMARY OF THE INVENTION

The present invention provides photographic apparatus including an indicating device interposed between the housing of a self-developing type of camera and hand-engageable strap for automatically providing the operator with an indication as to when the processing of a particular exposed sheet of material has been completed. The indicating device is adapted to operate in response to a force substantially equivalent to that for effecting withdrawal of the photographic materials from the camera. Accordingly, when the camera is manually supported by the strap with one hand and force is applied for drawing photographic materials between the spreaders by the other, such force is exerted upon the indicating device through the housing and the strap for initiating the operation of the indicating device.

As indicated, the photosensitive sheet and receiving sheet are drawn into superposition subsequent to photographic exposure of the photosensitive sheet and thereafter the two sheets are drawn through the spreader members in superposition for initiating the development process. In a preferred embodiment, the indicating means is adapted to be cocked in response to exertion and release of a first force which draws the sheets into superposition and tripped to perform the timing operation in response to exertion and release of a second force which effects the movement of the two sheets through the spreaders. It will be understood, however, that apparatus of this invention need not be cocked and then tripped in response to exertion and release of first and second forces respectively. The apparatus may be operative in response to a single force effective to advance the photographic materials through the spreaders.

Therefore, one primary object of this invention is to provide improved apparatus for automatically indicating when fluid-treated photographic materials have been completely processed.

It is another primary object of this invention to provide apparatus for automatically indicating completion of the development of photographic materials by the diffusion transfer process.

A further object of this invention is to provide hand-held apparatus for processing photographic materials according to the diffusion transfer development process wherein a force exerted for producing relative movement between a processing fluid spreader and the photographic materials initiates timing means for indicating completion of the process.

DETAILED DESCRIPTION OF THE DRAWINGS

Figure 1:
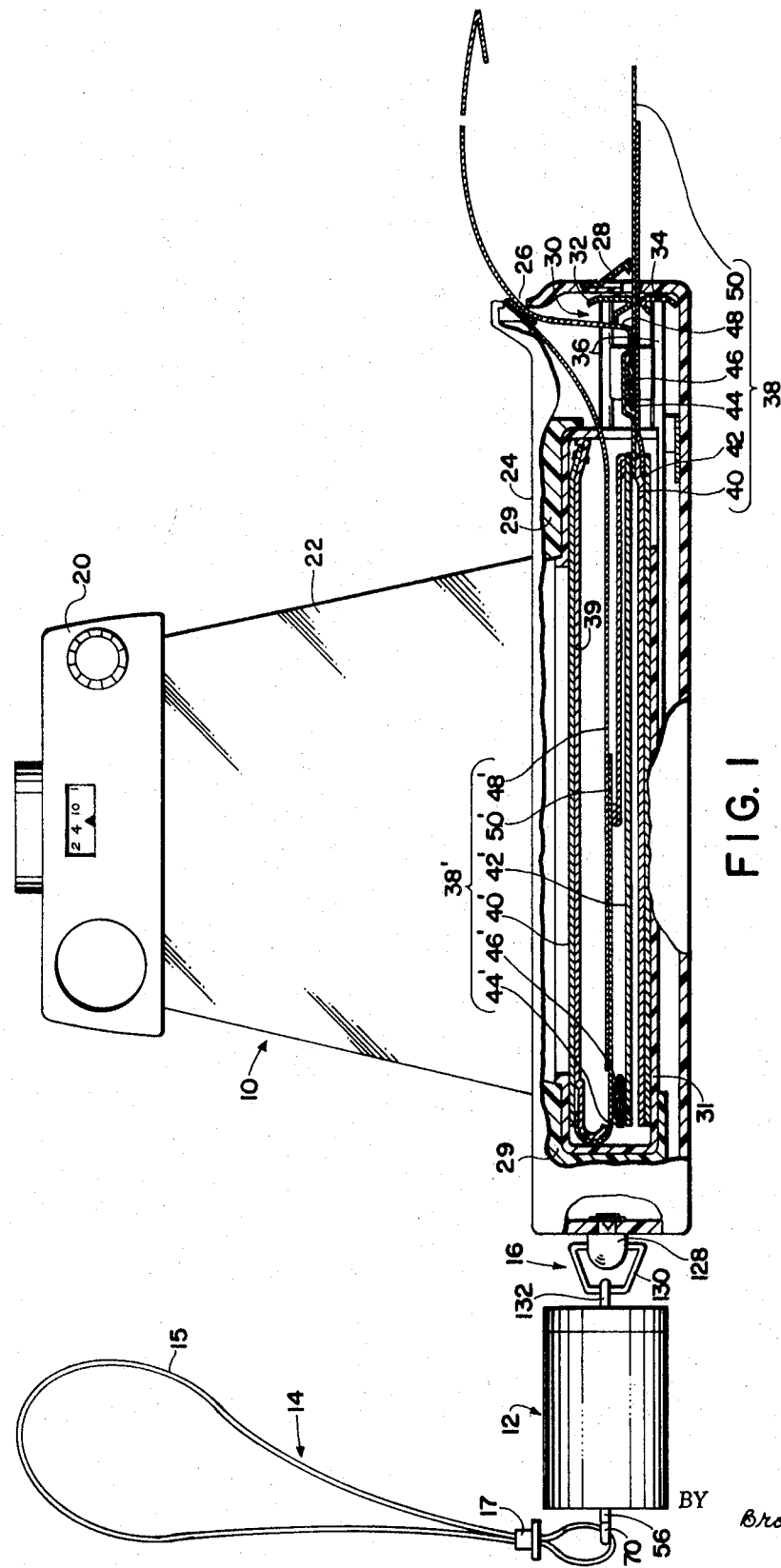
FIG. 1 is a cutaway side elevation view, partly in section, illustrating photographic apparatus constructed in accordance with a preferred embodiment of this invention.

FIG. 1 of the drawings illustrates a preferred embodiment of the apparatus of this invention including camera 10, indicating means 12 and hand-engageable structure 14. Structure 14 comprises strap loop 15 connected to one end of indicating means 12 and on which puller member 17 is fixedly mounted. The end of indicating means 12 opposite the aforesaid one end thereof and camera 10 are joined by connecting means 16.

Camera 10 includes a housing enclosing lens and shutter assembly 20, bellows 22, and back portion 24. Back 24 defines opening 26, exit door 28, and means 29 for supporting package 31 which contains a number of assemblies 38 and 38' of photographic sheet material. Back 24 is further adapted to support spreader means 30. Spreader means 30 is described in detail in U.S. Pat. Application Ser. No. 655,835 filed July 25, 1967 now Pat. No. 3,498,196 in the name of Patrick L. Finelli and entitled Photographic Apparatus. Briefly, spreader means 30 includes spreaders 32 and 34 biased toward each other by spring means 36 to form a narrow gap through which photographic material may be moved in a right-hand direction as viewed in FIG. 1. The gap extends in a direction perpendicular to the direction of movement of the photographic materials therethrough. Assemblies 38 and 38' respectively comprise photosensitive sheets 40 and 40', image-receiving sheets 42 and 42', rupturable pods 44 and 44' containing processing fluid 46 and 46', first leaders 48 and 48' and second leaders 50 and 50'. Assembly 38', as illustrated, is situated for exposure in response to exposure-producing operation of the camera. Assembly 38 is illustrated in that condition occurring after the exposed photosensitive sheet 40 has been drawn into superposition with image-receiving sheet 42, just prior to separation of first leader 48 from the remainder of assembly 38, which will hereafter be described in more detail.

Figure 3:
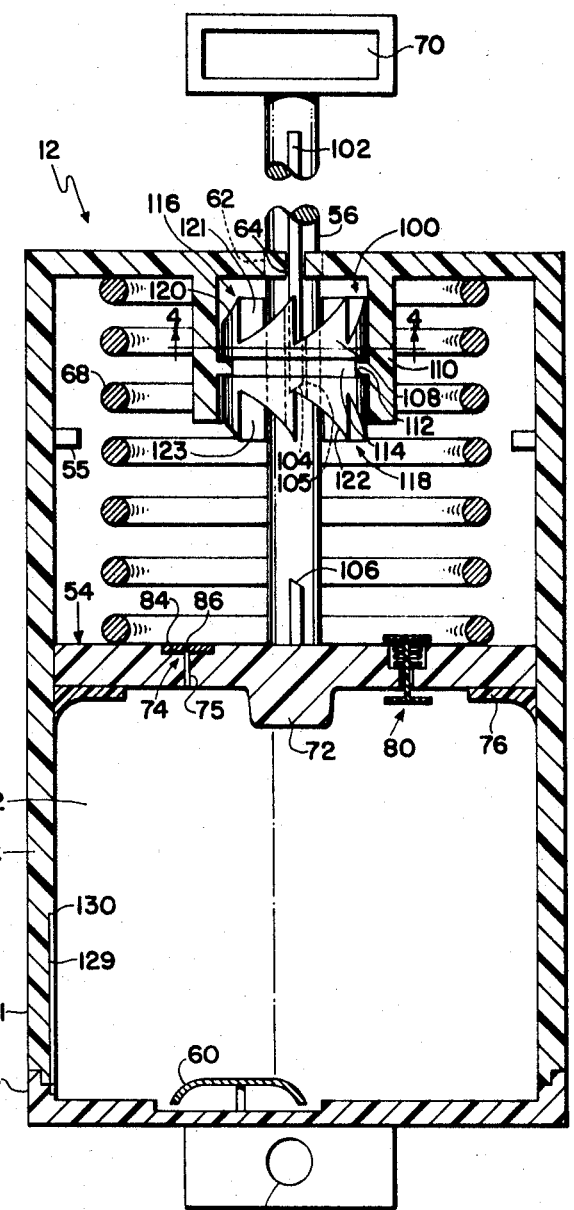
FIG. 3 is a sectional view illustrating one embodiment of the indicating device of the apparatus of FIG. 1.
Figure 4:
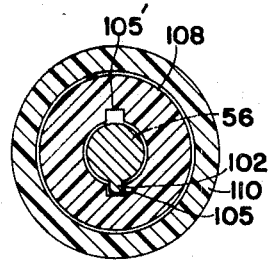
FIG. 4 is a sectional view taken along lines 4—4 of FIG. 3.

Referring to FIG. 3, the internal structure of indicating means 12 is shown in more elaborate detail. Indicating means 12 is a pneumatic timer. Cylinder 52 slidably receives piston 54 and piston rod 56. Lower end portion 58 of cylinder 52 supports means forming opening 132 for cooperation with connecting means 16 and supports bell means 60. Upper portion 61 of cylinder 52 defines opening 62 and slot 64 for respectively receiving piston rod 56 and rail 102 extending along one side thereof as shown in FIG. 4. Cooperation between slot 64 and rail 102 prevents relative rotation between the piston and cylinder. An escape passage, designated 129, is formed partly in portion 58 and partly in portion 61. One end of piston rod 56 forms eye 70 for receiving strap 15. Spring 68 is interposed between an upper surface of piston 54 and the upper end of cylinder 52 for biasing the piston downward toward end 58 of the cylinder.

Piston 54 forms hammer 72 and supports one-way valve means 80, valve means 74, and plastic sealing means 76, which sealing means provides an airtight seal between the piston and the cylinder wall. One-way valve means 80 does not permit the passage of air therethrough during downward movement of piston 54 but permits free flow of air therethrough during upward movement thereof. Valve means 74 comprises metal plate 84 forming relatively small opening 86. The plate is mounted over relatively large passage 75 through the piston 54 so that opening 86 is aligned with that passage. The passage 75 and opening 86 provide continuous communication between chamber 82 and the atmospheric pressure conditions within the remaining portions of the cylinder 52 so that a controlled escape of air from chamber 82 is provided when the piston moves downwardly. The time required for downward movement of the piston from a position adjacent stop 55 of the position wherein hammer 72 strikes bell 60 is calibrated to equal the time required for development of photographic materials in assemblies 38 and 38' according to the diffusion transfer process. Calibration is determined by the diameter of opening 86. The diameter of opening 86 is functionally related to the volume of chamber 82, the force applied to piston 54 by spring 68 and the duration of the interval to be timed.

In the preferred embodiment a compact indicating means 12 is desired. The maximum volume of chamber 82 will be relatively small and therefore the diameter of opening 86 must be small. A very small opening may be formed in thin metal plate 84 by a photoetching process and the metal plate may then be secured by a suitable adhesive to the upper surface of piston 56 with opening 86 in alignment with passage 75. Alternately, small opening 86 may be formed by any other suitable method including methods for forming it directly through the piston.

Cam means 100 is provided for first "cocking" and subsequently "tripping" the spring-biased piston 54. The cam means comprises rail 102 extending along piston rod 56 and terminating in tooth 104, tooth 106 extending from a portion of piston rod 56 adjacent piston 54, rotatably mounted cam 108 and cage 110 supporting cam 108. The cage defines annular support 112 adapted to cooperate with annular recess 114 in the cam. Cam 108 defines upper and lower cam surfaces 116 and 118 respectively. Each of these cam surfaces defines six teeth of substantially equal size and configuration consisting of teeth 122 defined by lower cam surface 118 which cooperate with tooth 106 and teeth 120 formed by upper cam surface 116 which cooperate with tooth 104. The inner surface of cam 108 includes identical tracks 105 and 105' radially spaced 180° apart (FIG. 4).

Reference is now made to FIG. 1. Means 16 connecting indicating means 12 and camera 10 comprises rotatably mounted stud 128 which pivotally mounts metal loop 130. The stud is capable of rotating 360° relative the camera housing and metal loop 130 is adapted to engage cylinder 52 through opening 132. Stud 128 is located on the side of the camera housing opposite the side in which opening 26 and door 28 are located so that its axis of rotation is in parallel alignment with the sheets and lies approximately in a plane which passes through the center of gravity of the camera normal to photographic sheets 40 and 42. It can now be appreciated that the camera-indicating means and hand-engageable structure are all connected so that when the apparatus is held by strap 15 as illustrated in FIG. 2, and photographic materials are drawn between spreaders 32 and 34, the force exerted upon the photographic materials for drawing them between the spreaders is transmitted through the camera housing and strap 15 to indicating means 12.

Operation of the apparatus will now be described in detail (see FIG. 1). Lens and shutter assembly 20 is actuated to produce a photographic exposure and direct light from the scene being photographed to a photosensitive sheet 40 positioned in the camera focal plane, forward of support plate 39. Exposed photosensitive sheet 40 is the displaced from its position in the camera focal plane to a second position wherein it is superimposed upon image-receiving sheet 42 so that the exposed surface of the photosensitive sheet faces the image receiving surface of the image receiving sheet. The two sheets are then displaced in superposition through spreaders 32 and 34 to rupture pod 44 and spread processing fluid 46 evenly between the sheets, in a manner which is well known in the art.

Advancement of sheet 40 from its first to its second position is effected by manually grasping first leader 48, which is positioned to protrude slightly from opening 26, and exerting a first predetermined minimum pull force for drawing it through opening 26. Leader 48 is attached to sheet 40 so as to pull the sheet around the curved end of sheet-supporting plate 39 and then into superposition with an image-receiving sheet 42. As the photosensitive sheet is drawn into superposition with the image-receiving sheet, second leader 50 is introduced between spreaders 32 and 34 and extends through exit door 28. This is the condition illustrated in FIG. 1, assembly 38' remaining in position for subsequent photographic exposure and processing. Immediately after presentation of second leader 50 between the spreaders, first leader 48 separates from the remainder of assembly 38. Withdrawal of leader 48 from the camera causes the leader 48' associated with the next succeeding assembly, 38', to be presented through opening 26. Second leader 50 is then manually grasped and drawn away from the camera by a second predetermined minimum pull force to advance superimposed sheets 40 and 42 through spreaders 32 and 34 to effect the aforesaid rupture of pod 44 and distribution of processing fluid 46 between the two sheets. Development commences when sheets 40 and 42 are drawn between the spreaders in superposition. The sheets must then remain in superposition for a predetermined period of time (for example, 10 seconds) required for completion of the diffusion transfer development process. After lapse of the predetermined time period, the sheets are separated from each other to reveal a positive photographic print upon image-receiving sheet 42. If the sheets remain in superposition longer than the aforesaid predetermined period of time, overdevelopment will cause derogation of the finished print.

Figure 2:
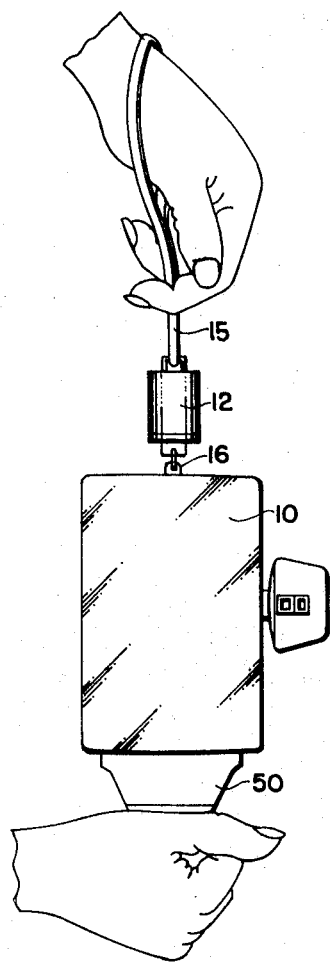
FIG. 2 is a diagrammatic view illustrating the apparatus of FIG. 1 in operation.

Preferably during these operations, the pulling forces on the leaders 48 and 50 are opposed by the operator's holding of puller member 17 with his wrist passing through strap 15 (See FIG. 2). The camera and the indicating means are permitted to hang from the strap and the photographic materials are drawn from the camera by pulling the first and second leaders, as described above, in a generally downward direction. As shown in FIG. 1, pivotal stud 128 permits the camera to align itself in the direction of the pull force exerted on the film sheets thereby facilitating even distribution of the processing fluid between sheets 40 and 42.

As the pull force is exerted upon first leader 48, the force is transmitted through the camera housing and strap 15 to timer 12. Spring 68 is selected to permit displacement of piston 54 from its lowermost position within the cylinder 52 into contact with stops 55 whenever the aforementioned pulling forces are exerted on the leaders 48 and 50. Whenever such forces are released, this spring 68 tends to return the piston to its original position within the cylinder. Application of the first pull force to leader 48 thus causes piston 54 to move upward within cylinder 52, thus enlarging chamber 82. This condition is illustrated in FIG. 3. As the piston moves up, valve means 80 permits rapid passage of air from atmospheric conditions outside chamber 82 into chamber 82 and rail 102 travels along track 105 in rotary cam 108. As this movement continues rail 102 is disengaged from the track so that tooth 104 clears the uppermost portion of teeth 120 disposed along upper cam surface 116. Immediately thereafter, tooth 106 engages one of the teeth 122 along lower cam surface 118 and causes cam 108 to rotate 60°. Rotation of cam 108 advances track 105 from alignment with rail 102. Upward movement of piston 54 is terminated as a cam tooth surface 123 engages tooth 106. Stops 55 provide additional means for firmly terminating upward movement of the piston. When first leader 48 separates from assembly 38, the first pull force on the system is released and spring 68 initiates advancement of piston 54 along cylinder 52 toward the lower end of the cylinder. Tooth 106 moves from engagement with lower cam surface 118 and just after tooth 106 has cleared the lower tips of teeth 122, tooth 104 engages one of the teeth 120 along upper cam surface 116 and causes a further 60° rotation of cam 108. Rotation of cam 108 and downward movement of piston 54 are terminated as a surface 121 of a tooth 120 comes into engagement with rail 102. The system is now cocked. It remains in this condition until a further pull force is applied to the indicating means.

As the camera continues to be held in the position described above, second leader 50 is manually grasped and the second pull force is applied thereto to draw superposed sheets 40 and 42 through the spreader members. As the second pull force is transmitted through the camera housing and strap 15 to indicating means 12, piston 54 is again advanced upwardly within cylinder 52 so as to cause tooth 104 to rise from upper cam surface 116 until it has again cleared teeth 120. Immediately thereafter tooth 106 engages another of the teeth 122 along lower cam surface 118 to impart an additional 60° rotation to cam 108. The sum of the rotary movements imparted to cam 108 since track 105 first moved from alignment with rail 102 equals 180° and thereby the second track, 105', is brought into alignment rail 102. Therefore, as the photographic assembly 38 is completely withdrawn from the camera and the second pull force on the system released, spring 68 is again free to drive piston 54 downward relative to cylinder 52 toward lower end 58 of the cylinder. Tooth 106 moves from engagement with lower cam surface 118 and immediately thereafter tooth 104 moves into the vicinity of upper cam surface 116. However, since track 105' has been moved into alignment with rail 102, tooth 104 does not engage one of the teeth of the upper cam surface but passes into track 105', leading rail 102 along the track. Piston 54 is thus free to move downward along cylinder 52. One-way valve means 80 does not permit the passage of air therethrough. The rate of downward movement of the piston is controlled by the rate of escape of air from chamber 82 into the atmosphere outside chamber 82 through opening 86. The cross-sectional area of opening 86 is calibrated so that the time required for the piston to move from stops 55 to upper end 130 of escape passage 129 is equivalent to the time required for development of the photographic materials. As the seal 76 of piston 54 passes upper end 130 of escape passage 129, the body of air in chamber 82 is free to rapidly escape by piston 54 without passing through calibrated opening 86. Consequently there is no air cushion within chamber 82 effectively resisting the tendency of spring 86 to drive piston 54 toward lower end portion 58 of cylinder 50. Therefore, the spring drives the piston downwardly at a rapid rate so that hammer 72 strikes bell 60 to signal the end of the development time. The operator will then know to separate superposed sheets 40 and 42. The timer thus attains its rundown condition from which it may be cocked in response to withdrawal of the next successive first leader 48' from the camera.

It will be appreciated that the timing operation begins when the piston beings to move from stops 55 after release of the second pull force and that such timing operation commences substantially simultaneously with commencement of the development process.

In certain applications it may be desirable to grip the camera rather than the strap while effecting the advancement of the two sheets of photographic material into superposition. Obviously, in this situation the timer will not need to be releaseably retained in its cocked condition and cam means 100, or its equivalent, will not be required. The timer will then be energized in response to application of the force for drawing the photographic material between the processing fluid spreaders and released for operation when such force is released.

The terms "upper," "lower," "left," "right" and the like are used in the foregoing specification to describe movement of various elements as seen in the FIGS. and are not intended to be used in a limiting sense.

Since certain changes may be made in the above apparatus without departing from the scope of this invention herein involved, it is intended that all mater contained in the above description or shown in the accompanying drawings shall be interpreted as illustrative and not in a limiting sense.

I claim:
1. Photographic apparatus comprising:
   a. a housing;
   b. means within said housing for supporting photographic sheet material;
   c. spreader means supported by said housing for spreading processing fluid onto a surface of such photographic sheet material when relative motion is imparted to such photographic sheet material and said spreader means responsive to a predetermined minimum force being exerted on such material and said spreader means, the processing of such material by such fluid being substantially completed after such fluid has been spread onto such surface for a predetermined period of time;
   d. a hand-engagable element independent of said sheet material;
   e. timing means responsive to the exertion thereon and subsequent release therefrom of a force on the order of such predetermined minimum force for indicating the lapse of such predetermined period of time; and
   f. means connecting said timing means between said hand-engageable element and said housing such that, when such predetermined minimum force is exerted through said hand-engageable means on such material and said spreader means, such force is transmitted to said timing means.
2. A photographic camera comprising:
   a. a housing including a support for photographic sheet material;
   b. a spreader supported by said housing for spreading processing fluid onto a surface of such photographic sheet material when relative motion is imparted to such photographic sheet material and said spreader responsive to a predetermined minimum force being exerted on such material and said spreader through one end of said housing, the processing of such material by such fluid being substantially completed after such fluid has been spread onto such surface for a predetermined period of time;
   c. a hand-engageable strap;
   d. a timer connecting said strap to the end of the housing opposite said one end thereof, said timer being responsive to the exertion thereon and subsequent release therefrom of a force on the order of such predetermined minimum force pulling for indicating the lapse of such predetermined period of time whereby, when such predetermined minimum pulling force is exerted on such material and said spreader through said strap, such force is transmitted to said timer.
3. Photographic apparatus comprising:
   a. a housing;
   means with said housing for supporting photographic sheet material;
   c. spreader means for spreading a processing fluid onto a surface of such photographic material as such material is operatively transported relative thereto responsive to a predetermined minimum force being exerted thereon, the processing of such material by such fluid being completed after such fluid has been spread onto such surface for a predetermined period of time;
   d. a hand-engageable element independent of said sheet material;
   e. means responsive to the exertion thereon and subsequent release therefrom of a force on the order of such predetermined minimum force for indicating the lapse of such predetermined period of time; and
   f. means for connecting said indicating means between said hand-engageable element and such housing whereby, when such predetermined minimum force is exerted on such material through said hand-engageable element, such force is transmitted by such housing to said indicating means.

4. Photographic apparatus according to claim 3 wherein said indicating means comprises means for releasably storing energy in response to exertion of such predetermined minimum force on such material.

5. Photographic apparatus according to claim 3 wherein said indicating means comprises a timer.

6. Photographic apparatus comprising:
   a. a housing;
   b. means within said housing for supporting photographic sheet material;
   c. spreader means for spreading a processing fluid onto a surface of such photographic material as such material is operatively transported relative thereto responsive to a predetermined minimum force being exerted thereon, the processing of such material by such fluid being completed after such fluid has been spread onto such surface for a predetermined period of time;
   d. a hand-engageable element;
   e. a pneumatic timer responsive to the exertion thereon and subsequent release therefrom of a force on the order of such predetermined minimum force for indicating the lapse of such predetermined period of time; and
   f. means for connecting said timer between said hand-engageable element and such housing whereby, when such predetermined minimum force is exerted on such material through said hand-engageable element, such force is transmitted by such housing to said indicating means.

7. Photographic apparatus comprising:
   a. a housing;
   b. means within said housing for supporting photographic sheet material;
   c. spreader means for spreading a processing fluid onto a surface of such photographic material as such material is operatively transported relative thereto responsive to a predetermined minimum force being exerted thereon, the processing of such material by such fluid being completed after such fluid has been spread onto such surface for a predetermined period of time;
   d. a hand-engageable element;
   e. means responsive to the exertion thereon and subsequent release therefrom of a force on the order of such predetermined minimum force for indicating the lapse of such predetermined period of time; and
   f. means for connecting said indicating means between said hand-engageable element and such housing, said connecting means permitting said housing to align itself in a direction parallel to the direction in which such force is exerted on such material, whereby, when such predetermined minimum force is exerted on such material through said hand-engageable element, such force is transmitted by such housing to said indicating means.

8. Apparatus for use with a photographic device for spreading a processing fluid onto a surface of photographic material, such device including a housing, means within such housing for supporting photographic sheet material, and a pair of spreader members for spreading such fluid onto such surface of such material as such material is transported therebetween responsive to a predetermined minimum force being applied to such material, the processing of such material by such fluid being completed after such fluid has been spread onto such surface for a predetermined period of time, comprising:
   a. a hand-engageable element independent of said sheet material;
   b. means responsive to the exertion thereon and subsequent release therefrom of a force on the order of such predetermined minimum force for indicating the lapse of such predetermined period of time; and
   c. means for connecting said indicating means between said hand-engageable element and such housing whereby, when such predetermined minimum force is exerted on such material through said hand-engageable element, such force is transmitted by such housing to said indicating means.

9. Apparatus according to claim 8 wherein said indicating means comprises means for releasably storing energy in response to exertion of such predetermined minimum force upon such material.

10. Apparatus according to claim 8 wherein said indicating means comprises a timer.

11. Apparatus for use with a photographic device for spreading a processing fluid onto a surface of photographic material, such device including a housing, means within such housing for supporting photograhic sheet material, and a pair of spreader members for spreading such fluid onto such surface of such material as such material is transported therebetween, responsive to a predetermined minimum force being applied to such material, the processing of such material by such fluid being completed after such fluid has been spread onto such surface for a predetermined period of time, comprising:
   a. a hand-engageable element;
   b. pneumatic timer means responsive to the exertion thereon and subsequent release therefrom of a force on the order of such predetermined minimum force for indicating the lapse of such predetermined period of time; and
   c. means for connecting said indicating means between said hand-engageable element and such housing whereby, when such predetermined minimum force is exerted on such material through said hand-engageable element, such force is transmitted by such housing to said indicating means.

12. Apparatus for use with a photographic device for spreading a processing fluid onto a surface of photographic material, such device including a housing, means within such housing for supporting, photographic sheet material, and a pair of spreader members for spreading such fluid onto such surface of such material as such material is transported therebetween, responsive to a predetermined minimum force being applied to such material, the processing of such material by such fluid being completed after such fluid has been spread onto such surface for a predetermined period of time, comprising:
   a. a hand-engageable element;
   b. means responsive to the exertion thereon and subsequent release therefrom of a force on the order of such predetermined minimum force for indicating the lapse of such predetermined period of time; and
   c. means for connecting said indicating means between said hand-engageable element and such housing, said connecting means permitting said housing to align itself in a direction parallel to the direction in which such force is exerted on such material whereby, when such predetermined minimum force is exerted on such material through said hand-engageable element, such force is transmitted by such housing to said indicating means.

13. Apparatus for use with a photographic device capable of spreading a processing fluid onto a surface of photographic sheet material, such device including a housing, means for supporting such photographic sheet material in a first position within such housing, and a pair of spreader members adapted to effect the spreading of such fluid onto such surface of such material as such material is transported therebetween, such photographic sheet material including a first leader for facilitating advancement of such material from such first position within such housing to a second position within such housing in response to exertion thereon of a first predetermined minimum pulling force and a second leader for facilitating advancement of such material between such spreader members in response to exertion thereon of a second predetermined minimum pulling force, such second leader being introduced between such spreader members as such material is advanced from such first position to such second position, the processing of such material by such fluid being completed after such fluid has been spread onto such surface for a predetermined period of time, comprising:
   a. a hand-engageable element;

b. means for indicating the lapse of such predetermined period of time, said indicating means adapted to be energized in response to exertion thereon of a force on the order of such first predetermined minimum pulling force and adapted to commence the release of the energy so stored therein in response to the subsequent exertion thereon and release therefrom of a force on the order of such second predetermined minimum pulling force; and c. means for connecting said indicating means between said hand-engageable element and such housing whereby, when such predetermined minimum pulling forces are exerted on such leaders through said hand-engageable element, such forces are transmitted by such housing to said indicating means.

14. Apparatus according to claim 13 wherein said indicating means includes camming means for precluding the release of energy so stored upon release of such first pulling force and for facilitating the release of such energy upon the subsequent release of such second pulling force.

15. Apparatus according to claim 13 wherein said indicating means comprises a timer.

16. Apparatus according to claim 15 wherein said timer is pneumatic.

17. Apparatus according to claim 13 wherein said connecting means permits such housing to align itself in a direction parallel to the direction in which such forces are exerted on such material.

* * * * *